United States Patent
Baek et al.

(10) Patent No.: US 11,039,295 B2
(45) Date of Patent: Jun. 15, 2021

(54) METHOD FOR SAVING ON MANAGED RESOURCES AND DEVICE THEREFOR

(71) Applicant: Samsung Electronics Co., Ltd., Gyeonggi-do (KR)

(72) Inventors: Youngkyo Baek, Seoul (KR); Sunghoon Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/339,253

(22) PCT Filed: Sep. 28, 2017

(86) PCT No.: PCT/KR2017/010889
§ 371 (c)(1),
(2) Date: Apr. 3, 2019

(87) PCT Pub. No.: WO2018/066906
PCT Pub. Date: Apr. 12, 2018

(65) Prior Publication Data
US 2019/0239062 A1  Aug. 1, 2019

(30) Foreign Application Priority Data
Oct. 4, 2016 (KR) .......................... 10-2016-0127669

(51) Int. Cl.
*H04W 8/12* (2009.01)
*H04W 24/02* (2009.01)
(Continued)

(52) U.S. Cl.
CPC ............... *H04W 8/12* (2013.01); *H04W 8/02* (2013.01); *H04W 24/02* (2013.01);
(Continued)

(58) Field of Classification Search
CPC ... H04W 8/12; H04W 36/0022; H04W 88/12; H04W 88/023; H04W 60/06; H04W 8/02;
(Continued)

(56) References Cited

U.S. PATENT DOCUMENTS

| 2013/0223222 A1 | 8/2013 | Kotecha et al. |
| 2015/0003228 A1* | 1/2015 | Choi ..................... H04W 76/19 370/216 |

(Continued)

FOREIGN PATENT DOCUMENTS

| EP | 2713664 | 4/2014 |
| WO | WO 2016144147 | 9/2016 |

OTHER PUBLICATIONS

PCT/ISA/210 Search Report issued on PCT/KR2017/010889, pp. 5).

(Continued)

*Primary Examiner* — Faisal Choudhury
(74) *Attorney, Agent, or Firm* — The Farrell Law Firm, P.C.

(57) ABSTRACT

The present invention relates to a method for saving on managed resources and a device therefor. A communication method of a terminal, according to one embodiment of the present invention, may comprise the steps of: determining whether a terminal and an MME are both capable of attaching without creating a PDN connection; in case the terminal and the MME are both capable of attaching without creating a PDN connection, determining whether a condition for not creating a PDN connection is satisfied; and in case the condition for not creating a PDN connection is satisfied, transmitting, to the MME, an attach request message including information associated with a request for not creating a PDN connection.

11 Claims, 13 Drawing Sheets

(51) Int. Cl.

| | |
|---|---|
| *H04W 48/02* | (2009.01) |
| *H04W 52/02* | (2009.01) |
| *H04W 60/00* | (2009.01) |
| *H04W 8/02* | (2009.01) |
| *H04W 36/00* | (2009.01) |
| *H04W 60/06* | (2009.01) |
| *H04W 88/02* | (2009.01) |
| *H04W 88/12* | (2009.01) |

(52) U.S. Cl.
CPC ....... *H04W 36/0022* (2013.01); *H04W 48/02* (2013.01); *H04W 52/02* (2013.01); *H04W 60/00* (2013.01); *H04W 60/06* (2013.01); *H04W 88/023* (2013.01); *H04W 88/12* (2013.01); *Y02D 30/70* (2020.08)

(58) Field of Classification Search
CPC ..... H04W 24/02; H04W 48/02; H04W 52/02; H04W 60/00
USPC .......................................................... 370/329
See application file for complete search history.

(56) References Cited

U.S. PATENT DOCUMENTS

| | | | |
|---|---|---|---|
| 2015/0257115 A1* | 9/2015 | Jokimies | H04W 60/00 455/435.1 |
| 2016/0227590 A1 | 8/2016 | Huang et al. | |
| 2017/0289098 A1* | 10/2017 | Chun | H04L 61/103 |
| 2018/0054760 A1 | 2/2018 | Chun | |
| 2018/0077668 A1* | 3/2018 | Chun | H04W 76/23 |
| 2018/0376531 A1* | 12/2018 | Martinez Tarradell | H04W 76/10 |
| 2019/0037441 A1* | 1/2019 | Liu | H04W 4/70 |

OTHER PUBLICATIONS

PCT/ISA/237 Written Opinion issued on PCT/KR2017/010889, pp. 6).
3GPP TS 24.301 V14.1.0, Sep. 30, 2016, 3rd Generation Partnership Project; Technical Specification Group Core Network and Terminals; Non-Access-Stratum (NAS) protocol . . . for Evolved Packet System (EPS); Stage 3 (Release 14), Copyright 2016, 3GPP Organizational Partners, pp. 462.
Nokia et al., "ePCO Support by UEs Supporting NB-S1 Mode or Non-IP PDN Type", C1-164001, 3GPP TSG-CT WG1 Meeting #99, Jul. 25-29, 2016, 20 pages.
HTC, "Handling of Support Indication for a CIoT Feature Sent in System Info and NAS Message", S2-162441, SA WG2 Meeting #115, May 23-27, 2016, 3 pages.
Intel, "Support of EMM-Registered without PDN Connectivity", C1-161055, 3GPP TSG-CT1 Meeting #96, Feb. 15-19, 2016, 46 pages.
3GPP CT WG1, "LS on Indication of Support of "Attach without PDN Connectivity" in SIB for NB-IoT and WB-EUTRAN", C1-161947, 3GPP TSG CT WG 1 Meeting 97, Apr. 11-15, 2016, 2 pages.
European Search Report dated Jul. 4, 2019 issued in counterpart application No. 17858700.2-1214, 16 pages.

* cited by examiner

METHOD FOR SAVING ON MANAGED RESOURCES AND DEVICE THEREFOR

PRIORITY

This application is a National Phase Entry of PCT International Application No. PCT/KR2017/010889 which was filed on Sep. 28, 2017, and claims priority to Korean Patent Application No. 10-2016-0127669, which was filed on Oct. 4, 2016, the content of each of which is incorporated herein by reference.

TECHNICAL FIELD

The disclosure relates to a method and a device for saving management resources, and more particularly, to a method for saving resources used by a terminal and a network in case of applying cellular Internet of things (IoT) technology in a cellular network, such as an evolved packet system (EPS).

BACKGROUND ART

In general, a mobile communication system has been developed for the purpose of providing communications while securing user's mobility. With the rapid progress of technology, such a mobile communication system can now provide not only voice communication but also high-speed data communication services.

Recently, as one of the next-generation mobile communication systems, standardization works for a long term evolution (LTE) system are currently underway in the $3^{rd}$ Generation Partnership Project (3GPP). The LTE system is technology to implement high-speed packet-based communications having the maximum transmission speed of about 100 Mbps that is higher than the data rate being currently provided to take aim at commercialization in the year of 2010, and the standardization thereof has almost been completed.

DISCLOSURE OF INVENTION

Technical Problem

An aspect of the disclosure provides a method for applying packet switched (PS) data off in case where both a terminal and a mobility management entity (MME) support an attach without packet data network (PDN) connection that is the characteristic of enabling a terminal not to establish the PDN connection although the terminal is attached to a network.

Another aspect of the disclosure provides a method for saving resources of a terminal and an MME in case where the terminal is attached to a network by an attach without PDN connection, but does not receive a circuit switched (CS) service. Technical tasks to be accomplished by the disclosure are not limited to those as described above, and unmentioned or other technical tasks could be clearly understood by those of ordinary skill in the art to which the disclosure pertains from the following description.

Solution to Problem

In one aspect of the disclosure to achieve the above objects, a communication method by a terminal includes determining whether the terminal and a mobility management entity (MME) are to be attached without establishing a packet data network (PDN) connection; determining whether a condition for not establishing the PDN connection is satisfied, in case that the terminal and the MME are to be attached without establishing the PDN connection; and transmitting, to the MME, an attach request message including information for requesting not to establish the PDN connection, in case that the condition for not establishing the PDN connection is satisfied.

The communication method by the terminal may further include determining whether a condition for configuring the PDN connection is satisfied after an attaching without the PDN connection is completed in accordance with the attach request message; and transmitting a PDN connection request message to the MME in case that the condition for configuring the PDN connection is satisfied.

The condition for not establishing the PDN connection may include at least one of whether the terminal is configured to use only a circuit switched (CS) service, whether the terminal has a usage limit not to use a packet switched (PS) data service during roaming, whether the terminal is limited not to use the PS data service any more, whether the terminal is a terminal requiring only a control signal to use the service, or whether information for indicating not to establish the PDN connection is received from a user.

Transmitting the attach request message to the MME may further include operating a timer in case that an attaching for a circuit switched (CS) service is not made; and transmitting a detach request message to the MME in case that the timer expires.

In another aspect of the disclosure to achieve the above objects, a terminal includes a transceiver configured to transmit and receive signals; and a controller configured to determine whether the terminal and a mobility management entity (MME) are to be attached without establishing a packet data network (PDN) connection, determine whether a condition for not establishing the PDN connection is satisfied, in case that the terminal and the MME are to be attached without establishing the PDN connection, and transmit, to the MME, an attach request message including information for requesting not to establish the PDN connection, in case that the condition for not establishing the PDN connection is satisfied.

The controller may be configured to determine whether a condition for configuring the PDN connection is satisfied after an attaching without the PDN connection is completed in accordance with the attach request message, and transmit a PDN connection request message to the MME, in case that the condition for configuring the PDN connection is satisfied.

The controller may be configured to operate a timer in case that an attaching for a circuit switched (CS) service is not made, and transmit a detach request message to the MME if the timer expires.

In still another aspect of the disclosure to achieve the above objects, a communication method by a mobility management entity (MME) includes determining whether a terminal and the MME are to be attached without establishing a packet data network (PDN) connection; determining whether a condition for not establishing the PDN connection is satisfied, in case that the terminal and the MME are to be attached without establishing the PDN connection; and transmitting, to the terminal, an attach response message including information for indicating not to establish the PDN connection, in case that the condition for not establishing the PDN connection is satisfied.

The communication method by the MME may further include transmitting, to a gateway, information on whether the terminal and the MME are to be attached without establishing the PDN connection.

The condition for not establishing the PDN connection may include at least one of whether usage of a packet switched (PS) data service is limited during roaming of the terminal or whether a gateway for configuring the PDN connection does not exist.

Transmitting the attach response message to the terminal may further include operating a timer in case that an attaching for a circuit switched (CS) service for the terminal is not made; and transmitting a detach request message to the terminal in case that the timer expires.

In yet still another aspect of the disclosure to achieve the above objects, a mobility management entity (MME) includes a transceiver configured to transmit and receive signals; and a controller configured to determine whether a terminal and the MME are to be attached without establishing a packet data network (PDN) connection, determine whether a condition for not establishing the PDN connection is satisfied, in case that the terminal and the MME are to be attached without establishing the PDN connection, and transmit, to the terminal, an attach response message including information for indicating not to establish the PDN connection, in case that the condition for not establishing the PDN connection is satisfied.

The controller may be configured to transmit, to a gateway, information on whether the terminal and the MME are to be attached without establishing the PDN connection.

The controller may be configured to operate a timer in case that an attaching for a circuit switched (CS) service for the terminal is not made, and transmit a detach request message to the terminal in case that the timer expires.

Advantageous Effects of Invention

According to the aspects of the disclosure, resource waste of the terminal and the network can be reduced by attaching without establishing the packet data network (PDN) connection in case where both the terminal and the MME support the attach without the PDN connection that is the characteristic of enabling the terminal not to establish the PDN connection although the terminal is attached to the network.

Further, power consumption of the terminal and the resource waste of the network can be reduced through the management in case where the terminal that does not use the CS and PS services is attached to the network.

Effects that can be obtained in the disclosure are not limited to those as described above, and unmentioned or other effects could be clearly understood by those of ordinary skill in the art to which the disclosure pertains from the following description.

MODE FOR THE INVENTION

Figure 1:
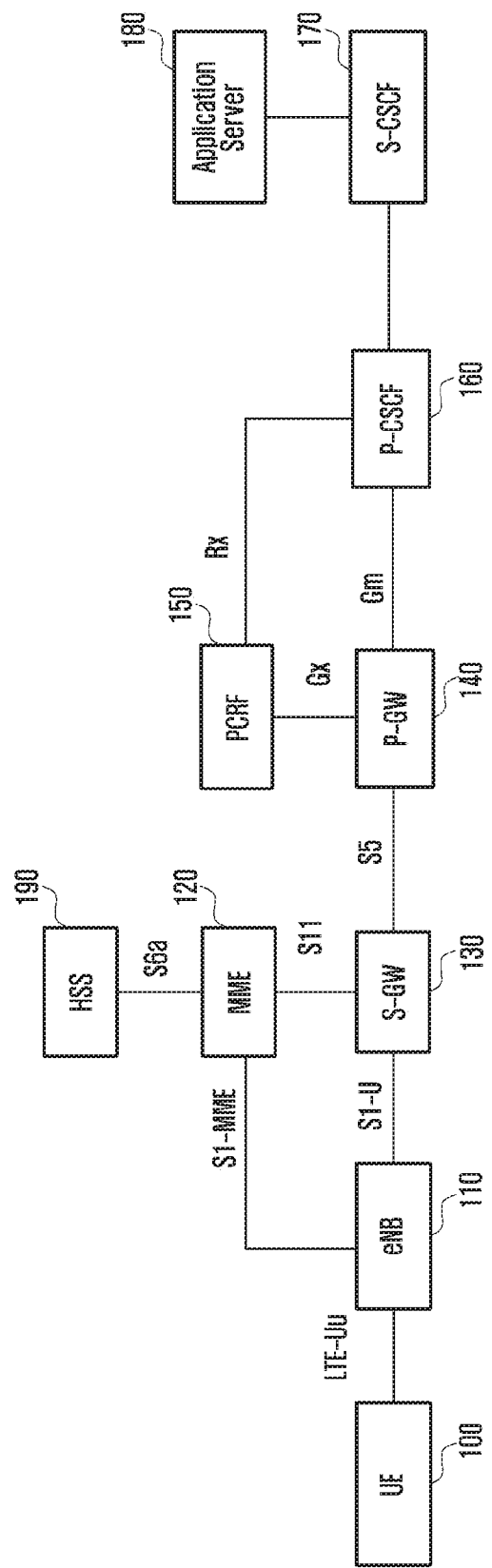
FIG. 1 is a diagram illustrating the structure of an LTE mobile communication system according to an embodiment of the disclosure.

Hereinafter, preferred embodiments of the disclosure will be described in detail with reference to the accompanying drawings. It is to be noted that the same drawing reference numerals are used for the same elements across the accompanying drawings. Further, detailed explanation of known functions and configurations that may obscure the subject matter of the disclosure will be omitted.

In describing embodiments of the disclosure in detail, although long term evolution (LTE) standardized by the $3^{rd}$ Generation Partnership Project (3GPP) will be the primary subject, the main gist of the disclosure can be applied to other communication systems having similar technical backgrounds with slight modifications within a range that does not greatly deviate from the scope of the disclosure, by the judgment of those skilled in the art to which the disclosure pertains.

In the description, if it is described that a certain constituent element is connected or attaches to another constituent element, it may mean that the certain constituent element is directly connected or directly attaches to the other constituent element, or it may mean that an intermediate constituent element exists to electrically connect the above-described constituent elements with each other. Further, in the description, the term "include(s)" a specific configuration may not mean that other configurations are excluded, but may mean that additional configurations can be included in the range of the technical idea of the disclosure.

Further, in embodiments of the disclosure, constituent parts are independently illustrated to indicate their different functional features, but do not mean that the respective constituent parts are not in the unit of separated hardware or one software configuration. That is, for convenience in explanation, the respective constituent parts are enumerated in succession, and at least two of the constituent parts may constitute one constituent part, or one constituent part may be divided into a plurality of constituent parts to perform corresponding functions. The integrated and separated embodiments of the respective constituent parts are included in the scope of the disclosure without departing from the essence of the disclosure.

Further, some constituent elements may not be essential constituent elements that perform the essential function in the disclosure, but may be selective constituent elements to improve the performance only. The disclosure may be implemented to include the essential constituent parts for implementing the essence of the disclosure excluding the constituent elements used for the performance improvement only, and the structure including the essential constituent elements excluding the selective constituent elements used for the performance improvement only is included in the scope of the disclosure.

In describing embodiments of the disclosure, related well-known functions or configurations incorporated herein are not described in detail in case where it is determined that they obscure the subject matter of the disclosure in unnecessary detail. Hereinafter, the embodiments of the disclosure will be described in detail with reference to the accompanying drawings. Further, terms to be described later are terms defined in consideration of their functions in the disclosure, but may differ depending on intentions of a user and an operator or customs. Accordingly, they should be defined based on the contents of the whole description of the disclosure.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, establish means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

FIG. 1 is a diagram illustrating the structure of an LTE mobile communication system according to an embodiment of the disclosure.

Referring to FIG. 1, a radio access network of a long term evolution (LTE) mobile communication system may include a base station (next-generation base station, Evolved Node B, EUTRAN, ENB, eNB, or Node B) 110, a mobility management entity (MME) 120, a serving gateway (S-GW) 130, a packet data network (PDN) gateway (P-GW) 140, a policy and charging rules function (PCRF) 150, a home subscriber server (HSS) 190, a proxy call session control function (P-CSCF) 160, a serving call session control function (S-CSCF) 170, and an application server 180.

A terminal (user terminal, user equipment, or UE) 100 may be attached to an external network through the base station 110, the S-GW 130, and the P-GW 140.

The base station 110 is a radio access network (RAN) node, and may correspond to a radio network controller (RNC) of a universal terrestrial radio access network (UTRAN) system and a base station controller (BSC) of a global system for mobile communications (GSM) enhanced data rates for GSM evolution (EDGE) radio access network (GERAN) system. The base station 110 is connected to the terminal 100 on a radio channel and plays a similar role to the existing RNC/BSC. Further, according to embodiments, the base station 110 can simultaneously use several cells.

In LTE, because all user traffics are serviced through a shared channel, a device for collecting and scheduling situation information of the terminals 100 is necessary, and the base station 110 takes charge of this.

The MME 120 is a device that takes charge of various kinds of control functions, and one MME 120 may be connected to a plurality of base stations 110.

The S-GW 130 is a device that provides a data bearer, and establishes or removes the bearer under the control of the MME 120.

The PCRF 150 is a device that controls a policy related to user quality of service (QoS), and the policy and charging control (PCC) rule corresponding to the policy may be transferred and applied to the PCRF, that is, the P-GW 140. The PCRF 150 is an entity that controls the QoS and charging for traffics.

In general, a user plane (UP) means a path connecting between the terminal 100 that transmits and receives user data and the base station 110 that is a RAN node, a path between the base station 110 that is a RAN node and the S-GW 130, and a path between the S-GW 130 and the P-GW 140. Among the paths, a portion using a radio channel having severe resource limit corresponds to the path between the terminal 100 and the base station 110 that is a RAN node, and this path may use the radio channel having the severe resource limit.

In a wireless communication system, such as LTE, the unit capable of applying the QoS is an evolved packet system (EPS) bearer. One EPS bearer is used to transmit IP flows having the same QoS requirements. In the EPS bearer, parameters related to the QoS can be designated, and the parameters may include a QoS class identifier (QCI), an allocation and retention priority (ARP), and a guaranteed bit rate (GBR). The QCI is a parameter for defining the QoS priority as an integer value, and the ARP is a parameter used to determine whether to permit or reject establishment of a new EPS bearer. The GBR indicates a bandwidth fixedly guaranteed in the bearer, and allocates a bandwidth value in which the GBR type bearer is established and guaranteed in case of real-time communication (e.g., voice communication or video communication).

The EPS bearer corresponds to a packet data protocol (PDP) context of a general packet radio service (GPRS) system. One EPS bearer belongs to a PDN connection, and the PDN connection may have an access point name (APN) as its attribute.

On the other hand, in case of the terminal 100 and the network (e.g., MME 120) according to an embodiment of the disclosure, the terminal 100 may support an attach without packet data network (PDN) connection that is the characteristic of enabling the terminal 100 not to establish the PDN connection although the terminal 100 is attached to the network. Further, with respect to the terminal 100 that makes a combined attach for circuit switched (CS) and packet switched (PS) services, the terminal 100 or the network may desire to operate PS data off, that is, not to use PS data.

For example, there may be situations in which the terminal 100 intends to perform the PS data off, such as situations in which a user intends not to use PS data roaming during roaming, PS data usage configured in the terminal 100 exceeds the PS data usage limit, the terminal 100 operates in an ultra power saving mode to provide only voice services, and the terminal is dedicated to a location based service (LBS) whereby only a signaling message is serviced without using the PS data. In contrast with this, there may be situations in which the network intends to perform the PS data off, such as situations in which it is configured that the corresponding user does not perform the PS data roaming in the network (e.g., MME 120), the usage amount permitted to the corresponding user exceeds the usage amount limit in the network, and there occurs a problem in network equipment, for example, gateway equipment 140.

According to the existing method, in the terminal 100 and the network, it can be implemented that only data transmission is blocked or the terminal modem is turned off while the PDN connection is maintained. However, in this case, the terminal 100 should perform context management to continuously maintain an unused data radio bearer, and the network should maintain the PDN connection and the related EPS bearer context with respect to the terminal 100 that does not even use the data service, resulting in the waste of the resources of the base station 110 or the GWs 130 and 140.

Further, in the disclosure, in case where the terminal 100 makes an attach to the network without PDN connection, but does not receive the CS service, power consumption for the mobility management may occur in a situation in which the terminal 100 does not even receive the network service. Further, the MME 120 might have to continuously use the network resource for the mobility management of the terminal 100 that will not even receive the data service.

Hereinafter, a method for applying PS data off and a method for managing resources of a terminal 100 and an MME 120 according to an embodiment of the disclosure will be described.

Figure 2:
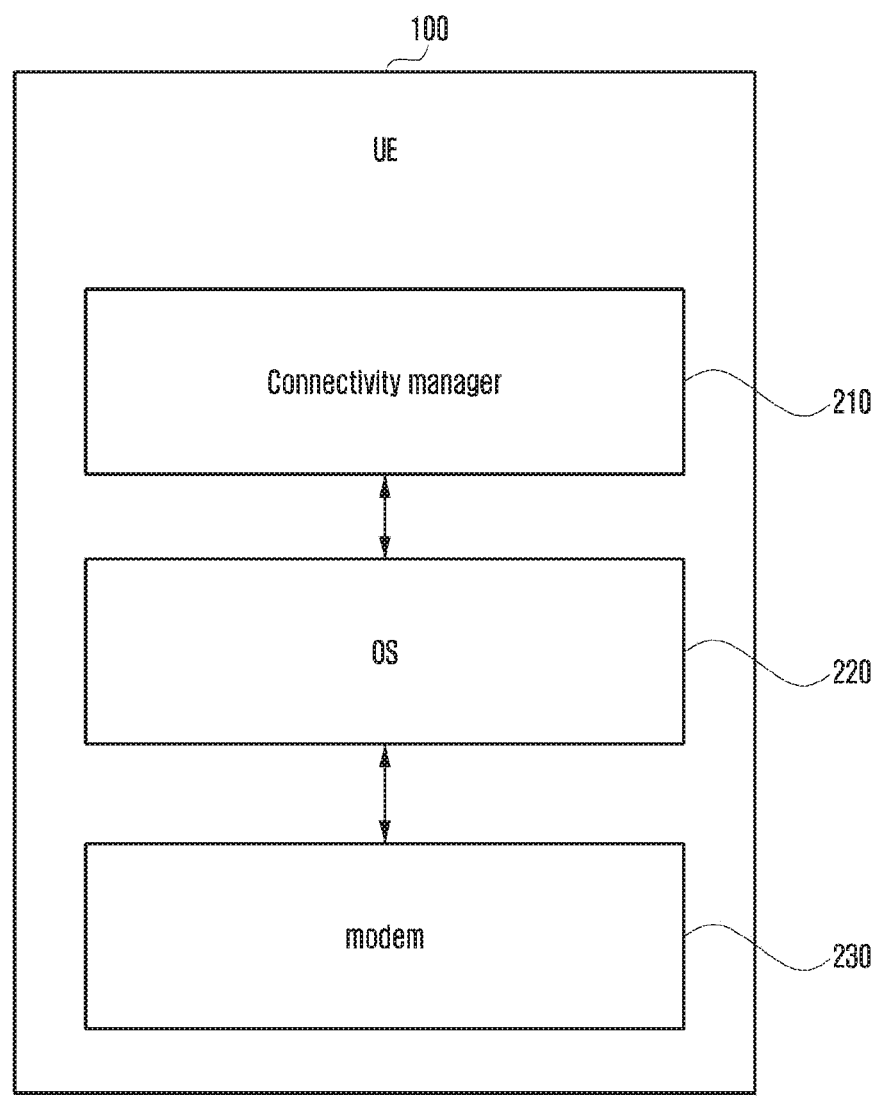
FIGS. 2 and 3 are diagrams illustrating the structures for explaining the internal operation of a terminal according to an embodiment of the disclosure.
Figure 3:
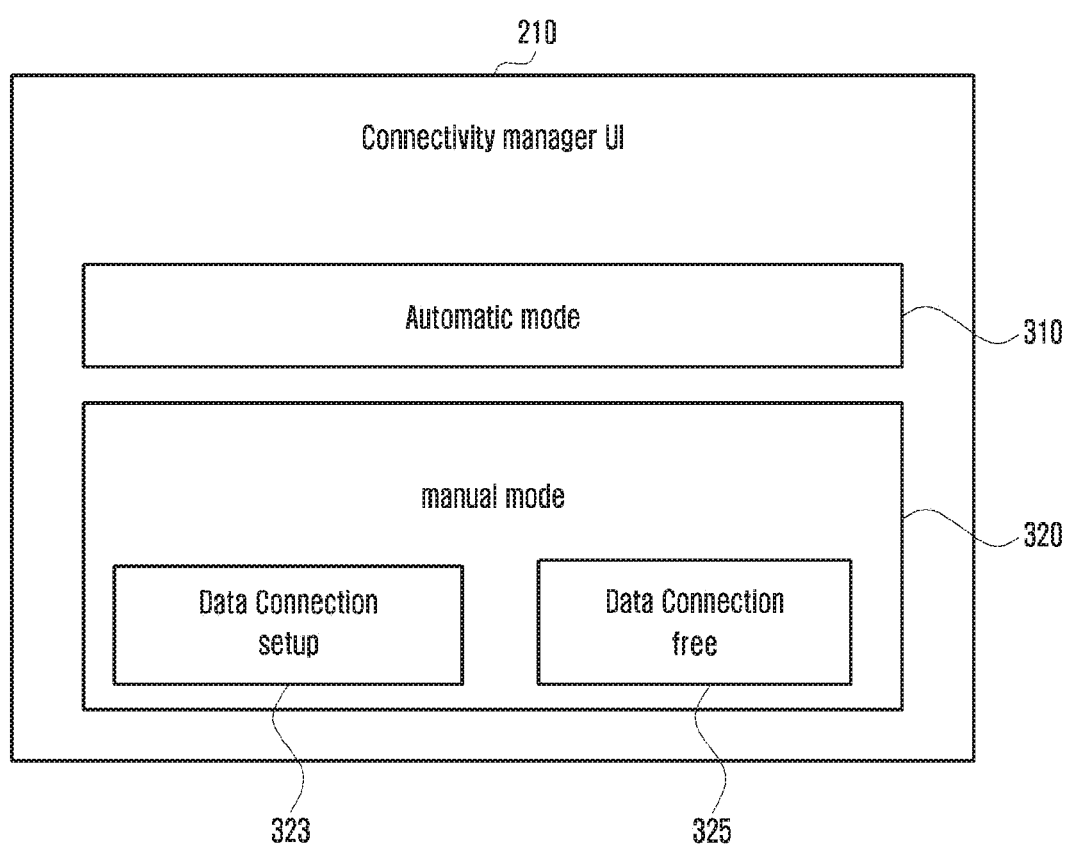

FIGS. 2 and 3 are diagrams illustrating the structures for explaining the internal operation of a terminal according to an embodiment of the disclosure.

In this case, FIG. 2 illustrates the internal operation structure of a terminal 100, and FIG. 3 illustrates the structure of a connectivity manager 210 of a terminal 100 and a user interface (UI).

Referring to FIGS. 2 and 3, the connectivity manager 210 of the terminal 100 is an application that is in association with a modem 230 through the operating system (OS) 220 and configures and manages information for making an attach to the communication system.

In an embodiment of the disclosure, the terminal 100 and the network (e.g., MME 120) can support an attach without PDN connection. In this case, the terminal 100 can automatically set whether to make a data connection (i.e., PDN connection) or to make an attach only without the data connection. In this case, the connectivity manager 210 of the terminal 100 may select an automatic mode 310. Further, a user may directly select whether to make the data connection or to make the attach only without the data connection. For this, in a manual mode 320, the connectivity manager 210 of the terminal 100 may provide a presenting UI so that the user can select either of data connection setup (i.e., attach with data connection) 323 and data connection free (i.e., attach without data connection) 325.

Figure 4:
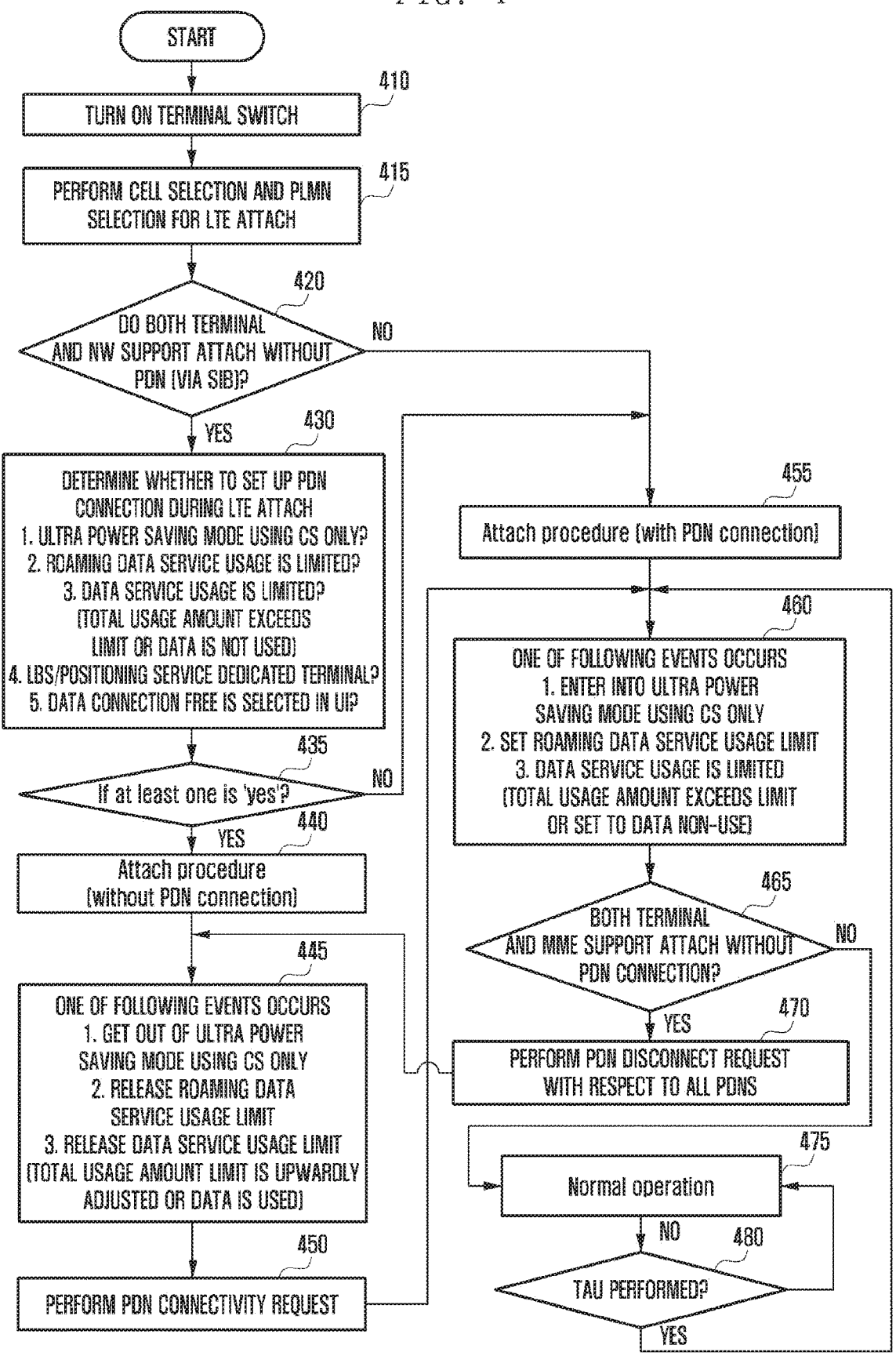
FIG. 4 is a diagram illustrating an example of a method for a terminal to effectively use resources according to an embodiment of the disclosure.

FIG. 4 is a diagram illustrating an example of a method for a terminal to effectively use resources according to an embodiment of the disclosure.

Referring to FIG. 4, the terminal 100 according to an embodiment of the disclosure can perform an operation for effectively using resources, such as PDN connection establishment or PDN disconnection.

At operation 410, the terminal 100 may be turned on, that is, the switch of the terminal 100 may be turned on to achieve power supply thereto. Further, at operation 415, the terminal 100 may perform cell selection and public land mobile network (PLMN) selection procedures to make an access to a long term evolution (LTE) network.

In this case, at operation 420, the terminal 100 can determine whether the network (e.g., MME 120) and the terminal 100 itself support an attach without PDN connection. According to embodiments, the terminal 100 may receive a system information block (SIB) message transmitted from the base station 120. The SIB message is a message that the MME 120 transmits to the terminal through the base station 110. Further, the terminal 100 can determine whether the network supports the attach without PDN connection through the information broadcasted by the base station 110. Further, the terminal 100 can be aware of its capability, and thus can determine whether the terminal 100 support the attach without PDN connection. Further, the terminal can determine how to make the attach.

If the terminal 100 or the network does not support the attach without PDN connection, during the attach at operation 455, the terminal 100 can perform piggy back of a PDN connectivity request message for requesting the PDN connection, and can transmit the PDN connectivity request message to the network (e.g., MME 120) together with an attach request message. Accordingly, the terminal 100 makes the attach as simultaneously making the PDN connection (i.e., attach with PDN connection).

In contrast, if the terminal 100 and the network support the attach without PDN connection, the terminal, at operation 430 and so on, may determine an attach method with reference to other setting information or capability conditions of the terminal 100. That is, the terminal 100 may determine whether to determine the PDN connection during the attach in accordance with predetermined conditions.

For example, as at operation 430, the terminal 100 can determine 1) whether the terminal 100 is in an ultra power saving mode in which the terminal 100 is set to use the CS service only, 2) whether the terminal 100 has a usage limit not to use the PS data service during roaming, 3) whether the terminal 100 has the usage amount limit of the PS data service, and is limited not to use the PS data service any more due to the usage of the PS data exceeding the predetermined total PS data usage amount, 4) whether the terminal 100 is dedicated to an LBS service or a positioning service, and thus requires only a control signal to use the service, and 5) whether information for selecting the data connection free 325 is input from the user through the connectivity manager 210 of the terminal 100.

Further, at operation 435, the terminal 100 can determine whether the situation of 'yes' is satisfied with respect to at least one of the conditions at operation 430.

If the at least one condition is satisfied as the result of the determination at operation 435, the terminal 100, at operation 440, may not send a PDN connectivity request message during the attach. Accordingly, even after the attach is successfully performed, the terminal 100 may not have the established PDN connection (i.e., attach without PDN connection).

On the other hand, as needed in future, the terminal 100 that operates without PDN connection may request the PDN connection from the network (e.g., MME 120). That is, the terminal 100 may determine whether to (re)configure the PDN connection in accordance with the predetermined condition.

For example, as at operation 445, the terminal 100 can determine 1) whether the terminal 100 gets out of the ultra power saving mode in which the terminal 100 uses only the CS service, 2) whether the terminal 100 releases the usage limit of the PS data service during roaming, 3) and whether the terminal 100 releases the usage limit of the PS data service through a method in which the terminal 100 performs upward adjustment of the total usage amount limit of the PS data service. Further, the terminal can determine 4) whether information for selecting data connection setup 323 is input from the user through the connectivity manager 210 of the terminal 100.

Further, if any one of the above-described conditions is satisfied as the result of the determination at operation 445, the terminal 100, at operation 450, may request the PDN connection by transmitting the PDN connectivity request message to the network.

In contrast, if at least one of the conditions is not satisfied as the result of the determination at operation 435, that is, if even any one of the predetermined conditions not to configure the PDN connection is not satisfied, the terminal 100, at operation 455, may transmit the PDN connectivity request message during the attach. Further, if the attach has succeeded, the terminal 100 has the PDN connection (i.e., attach with PDN connection).

On the other hand, the terminal 100 may be in an attach state with PDN connection through operation 455 or 450. As needed in future, the terminal 100 that operates with PDN connection may request a PDN disconnection from the network.

That is, if the predetermined condition is satisfied at operation 460, the terminal 100 may transmit a PDN disconnection request message.

For example, at operation 460, the terminal 100 can determine 1) whether the terminal 100 enters into the ultra power saving mode in which the terminal 100 is set to use only the CS service, 2) whether the terminal 100 has the usage limit not to use the PS data service during roaming, 3) whether the terminal 100 has the usage amount limit of the PS data service, and is limited not to use the PS data service any more due to the usage of the PS data exceeding the predetermined total PS data usage amount, and 4) whether information for selecting the data connection free 325 is input from the user through the connectivity manager 210 of the terminal 100.

Further, at operation 465, the terminal 100 can identify whether the MME 120 which the terminal 100 is currently attached to supports the attach without PDN connection. Further, at operation 465, the terminal 100 can also identify whether the terminal 100 itself supports the attach without PDN connection.

Thereafter, if both the MME 120 and the terminal 100 support the attach without PDN connection, the terminal 100, at operation 470, can delete all PDN connections allocated to the terminal 100 through a PDN disconnection request process. For example, the terminal 100 can transmit a PDN disconnection request message to the network (e.g., MME 120). On the other hand, according to embodiments, after deleting all the PDN connections at operation 470, the terminal 100 may proceed with operation 445 to determine whether to reconfigure the PDN connection.

On the other hand, if the MME 120 does not support the attach without PDN connection, the terminal 100 that performs a normal operation may perform a tracking area update (TAU) process as at operation 475 as needed. In this case, at operations 460 and 465, the terminal 100 may delete the PDN connections or perform a normal operation in accordance with the setting of the terminal 100 and the capability of the MME 120.

Figure 5:
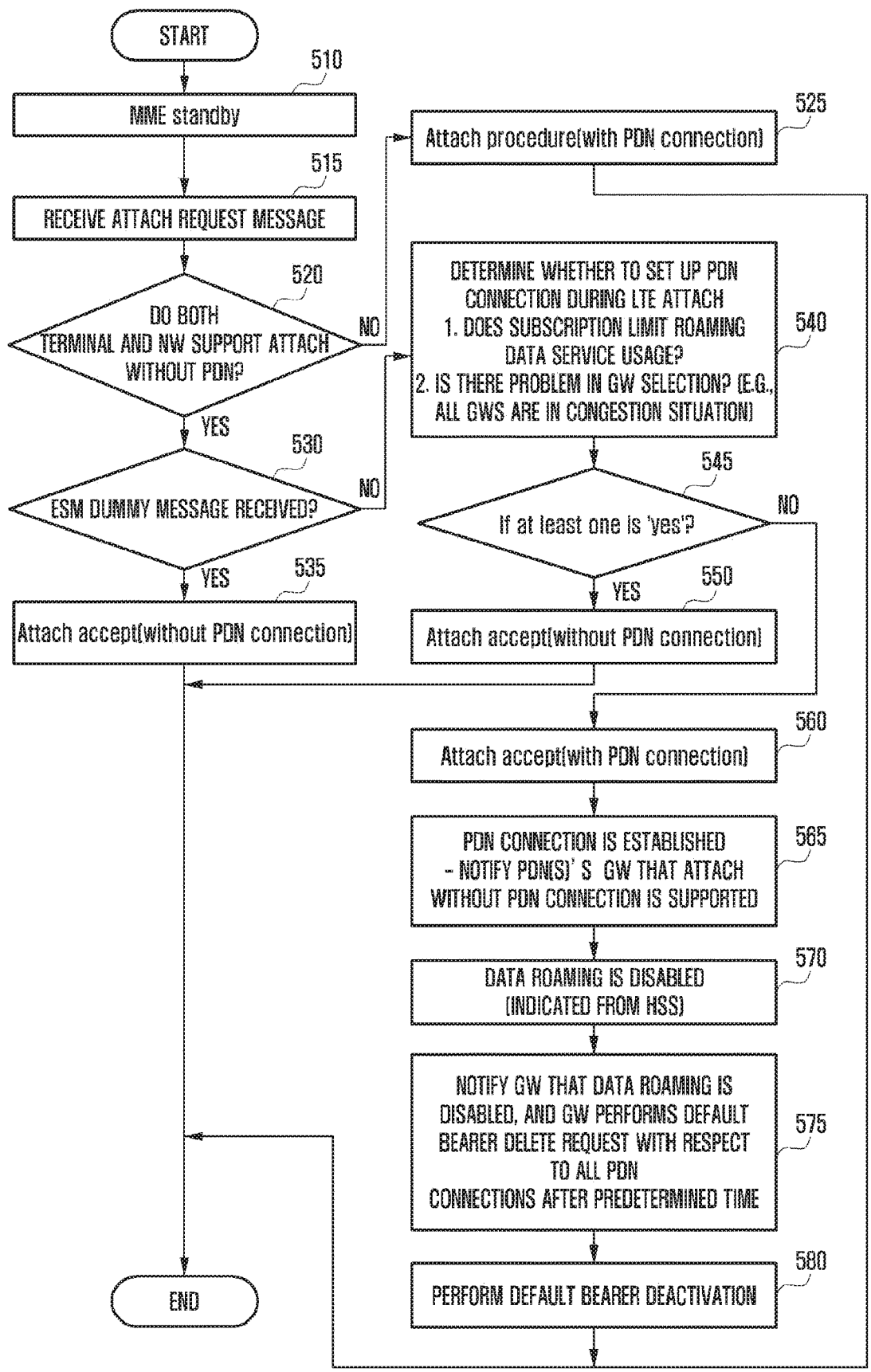
FIG. 5 is a diagram illustrating an example of a method for an MME to effectively use resources according to an embodiment of the disclosure.

FIG. 5 is a diagram illustrating an example of a method for an MME to effectively use resources according to an embodiment of the disclosure.

Referring to FIG. 5, the MME 120 according to an embodiment of the disclosure can perform an operation for effectively using resources, such as PDN connection establishment or PDN disconnection.

At operation 510, the MME 120 may be in a standby state in which a power is supplied. At operation 515, the MME 120 may receive an attach request message from the terminal 100.

Further, at operation 520, the MME 120 can identify whether both the terminal 100 that has sent the attach request message and the network (e.g., MME 120) support an attach without PDN connection.

If at least one of the terminal 100 and the network does not support the attach without PDN connection function, the MME 120, at operation 525, may perform an attach procedure in which the MME 120 makes the attach with establishing the PDN connection.

However, if both the terminal 100 and the network support the attach without PDN connection function, the MME 120 can determine whether the attach without PDN connection is requested from the terminal 100.

For example, the MME 120 can determine whether a PDN connectivity request message is included in the attach request message received from the terminal 100. Further, the MME 120 can identify whether a message including information for requesting the attach, for example, an evolved packet system (EPS) session management (ESM) dummy message, is included in the received attach request message.

If the MME 120 receives a request for the attach without PDN connection from the terminal 100, for example, if the MME 120 receives the ESM dummy message, the MME 120, at operation 535, may perform an attach procedure in which the MME 120 makes the attach without establishing the PDN connection (i.e., attach without PDN connection).

In contrast, if the MME 120 does not receive the request for the attach without PDN connection from the terminal 100, for example, if the ESM dummy message is not included in the received attach request message, the MME 120, at operation 540, may determine whether to establish the PDN connection in accordance with a condition predetermined in the MME 120. For this, the MME 120 may identify the predetermined condition.

For example, the MME 120 can check 1) whether subscription (e.g., it may be information received from an HSS 190) of the terminal 100 that has sent the attach request limits the PS data service usage during roaming, and 2) whether the MME 120 is unable to discover suitable GWs 130 and 140, that is, whether there is a problem in selecting the GWs 130 and 140, due to an abnormal situation, such as congestion.

If at least one of the conditions at operation 540 corresponds to 'yes' as the result of the determination at operation 545, the MME 120, at operation 550, may make the attach without establishing the PDN connection with respect to the corresponding terminal 100 (i.e., attach without PDN connection).

However, if all the conditions correspond to 'no' as the result of the determination at operation 545, the MME 120, at operation 560, may operate to make the attach as establishing the PDN connection to normally provide the PS data service to the terminal 100 (i.e., attach with PDN connection).

On the other hand, according to embodiments, if the PDN connection is established, the MME 120 may notify the GW that has established the PDN connection of information indicating that the terminal 100 and the network support the attach without PDN connection function. According to embodiments, the GWs 130 and 140 may be in collocation with the MME 120.

Thereafter, if an event occurs, in which the subscription is changed so that the PS data roaming for the corresponding terminal 100 is disabled, such subscription change may be transferred from the HSS 190 to the MME 120. Thereafter, at operation 575, the MME 120 may notify the GWs 130 and 140 that the PS data roaming is disabled.

Accordingly, at operation 575, the GWs 130 and 140 may trigger a default EPS bearer delete request with respect to all the PDN connections after a predetermined time. Accordingly, at operation 580, the MME 120 may perform a default EPS bearer deactivation process.

Figure 6:
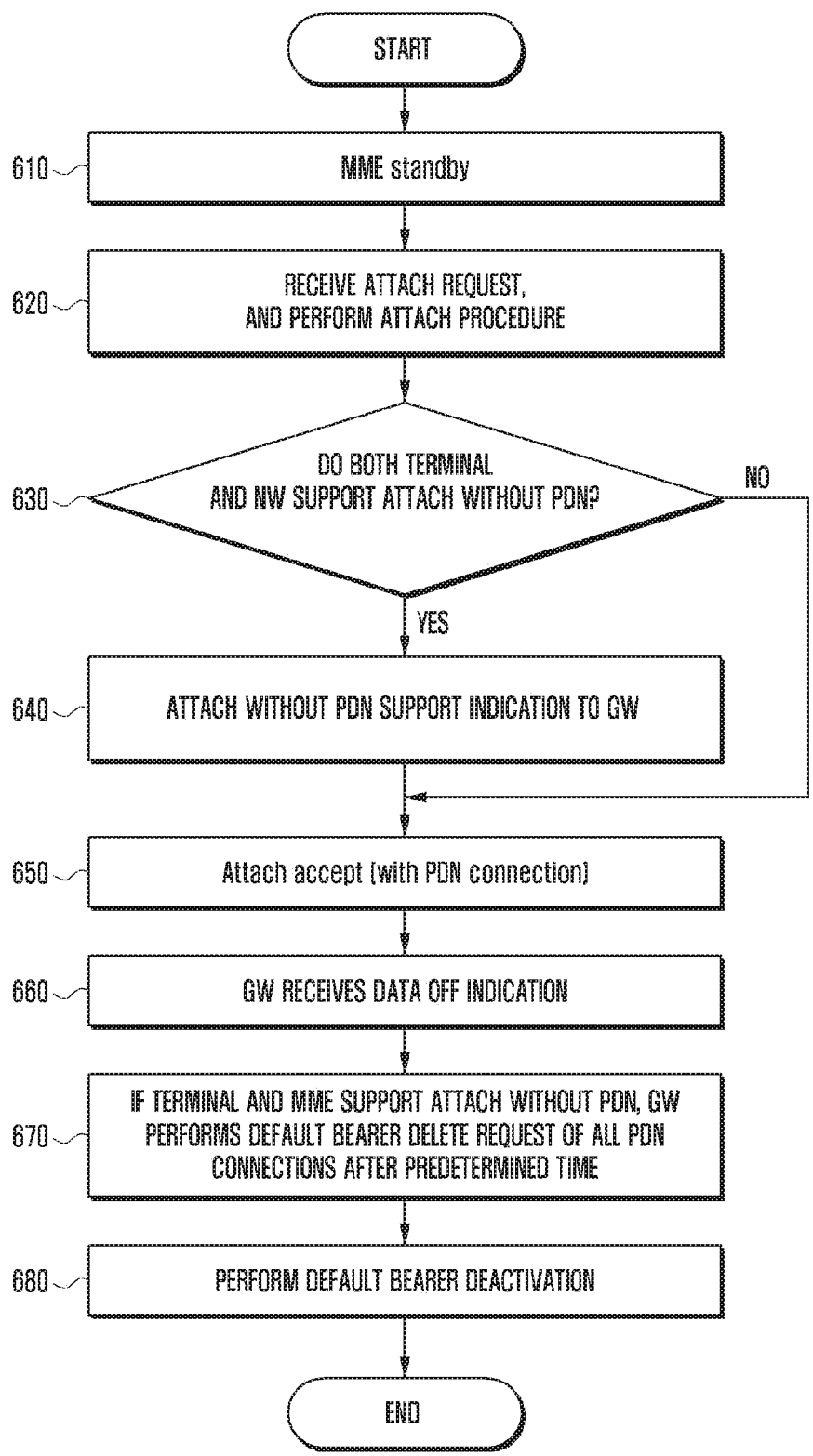
FIG. 6 is a diagram illustrating another example of a method for an MME to effectively use resources according to an embodiment of the disclosure.

FIG. 6 is a diagram illustrating another example of a method for an MME to effectively use resources according to an embodiment of the disclosure.

Referring to FIG. 6, in an embodiment of the disclosure, the MME 120 that is collocated with the GWs 130 and 140 can perform an operation for effectively using resources, such as PDN connection establishment or PDN disconnection.

At operation 610, the MME 120 may be in a standby state in which a power is supplied. At operation 620, the MME 120 may receive an attach request message from the terminal 100.

Further, at operation 630, the MME 120 can identify whether both the terminal 100 that has sent the attach request message and the network support an attach without PDN connection.

If both the terminal 100 and the network support the attach without PDN connection function, the MME 120, at operation 640, can transmit, to the GWs 130 and 140, information (or indication) indicating that the terminal 100 and the MME 120 support the attach without PDN connection.

Thereafter, at operation 650, the MME 120 may operate to make the attach with establishing the PDN connection to normally provide a PS data service to the terminal 100.

At operation 660, the GWs 130 and 140 may receive or identify information for requesting disabling of the PDN connection. For example, the subscription may be changed so that PS data roaming for the terminal 100 is disabled, or information (indication) indicating that the PS data usage amount is excessive may be transferred from an online charging system (OCS) to a PCRF 150, and thus the PCRF 150 may transmit an indication for notifying of the PS data off to the GWs 130 and 140.

Accordingly, at operation 670, the GWs 130 and 140 can trigger a default EPS bearer delete request message with respect to all the PDN connections after a predetermined time. Accordingly, at operation 680, the MME 120 may perform a default EPS bearer deactivation process.

Figure 7:
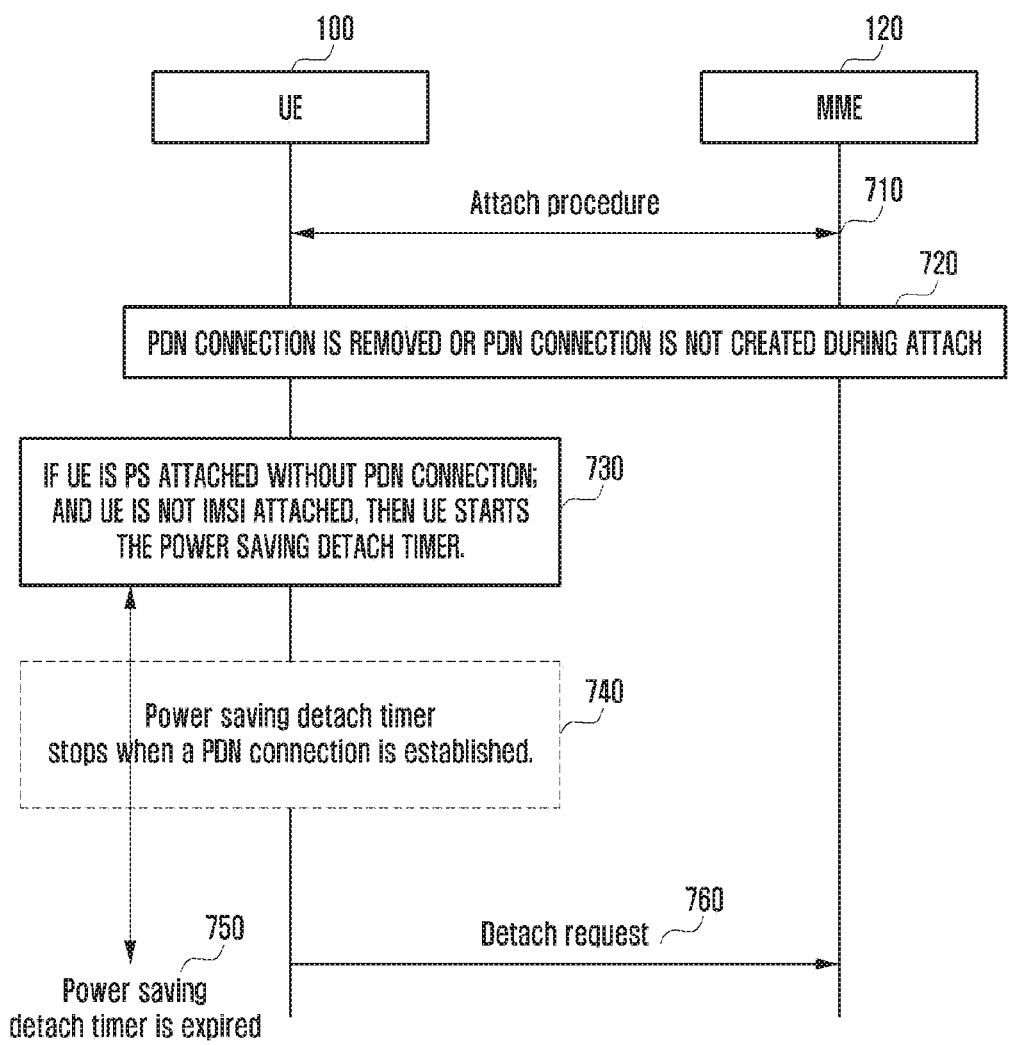
FIG. 7 is a diagram illustrating an example of a method for reducing power consumption of a terminal according to an embodiment of the disclosure.

FIG. 7 is a diagram illustrating an example of a method for reducing power consumption of a terminal according to an embodiment of the disclosure.

Referring to FIG. 7, when the terminal 100 according to an embodiment of the disclosure makes an attach without PDN connection, the terminal 100 can perform an operation for effectively saving resources.

At operation 710, the terminal 100 can be aware of whether the terminal 100 and the network 120 support an attach without PDN connection function through an attach process.

At operation 720, as needed, the terminal 100 may not establish the PDN connection in the attach process. Further, the terminal 100 made the PDN connection in the attach process, but due to PDN disconnection performed thereafter, the terminal 100 may be only in an attach state without PDN connection.

In this case, the terminal 100 may be in a situation in which the attach for the CS service is not made, for example, in a situation in which an international mobile subscriber identity (IMSI) attach is not made. At a time when the terminal 100 performs PDN disconnection or at a time when the terminal 100 successfully completes the attach without making the PDN connection, the terminal 100, at operation 730, can operate a timer for efficient power saving of the terminal 100. For example, the timer may be a power saving detach timer.

In this case, as at operation 740, if the PDN connection is established before the timer (e.g., power saving detach timer) expires, the timer (e.g., power saving detach timer) can stop.

On the other hand, if the timer (e.g., power saving detach timer) expires as at operation 750, the terminal 100, at operation 760, may transmit a detach request message to the network, that is, the MME 120, to be detached from the network.

Figure 8:
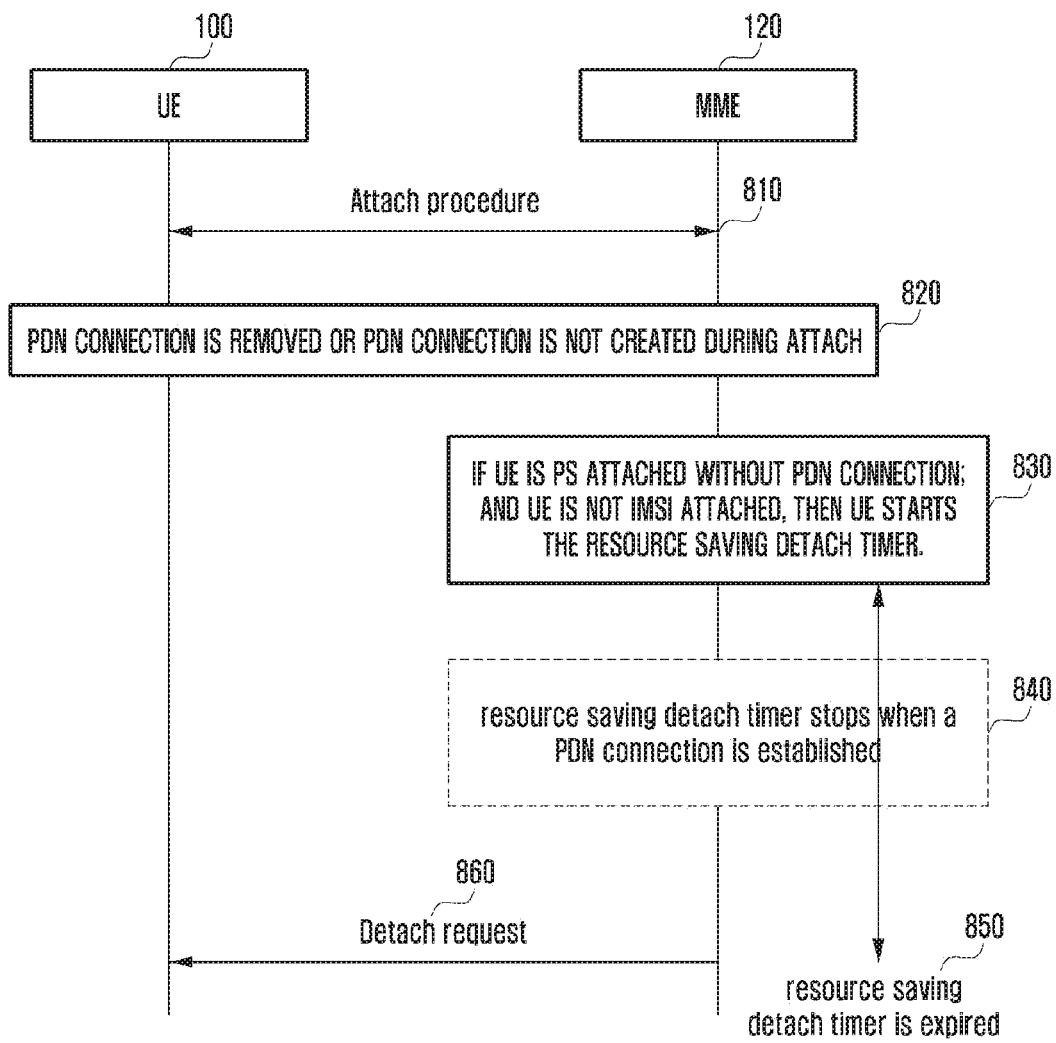
FIG. 8 is a diagram illustrating an example of a method for reducing power consumption of an MME according to an embodiment of the disclosure.

FIG. 8 is a diagram illustrating an example of a method for reducing power consumption of an MME according to an embodiment of the disclosure.

Referring to FIG. 8, when the terminal 100 makes an attach without PDN connection, the MME 120 according to an embodiment of the disclosure can perform an operation for effectively saving resources for the network (MME 120).

At operation 810, the terminal 100 and the MME 120 can be aware of whether the terminal 100 and the network 120 support an attach without PDN connection function through an attach process.

At operation 820, as needed, the MME 120 may not establish the PDN connection in the attach process. Further, the MME 120 made the PDN connection in the attach process, but due to PDN disconnection performed thereafter, the MME 120 may be only in an attach state without PDN connection.

In this case, the terminal 100 may be in a situation in which the attach for the CS service is not made, for example, in a situation in which the IMSI attach is not made. At a time when the MME 120 performs PDN disconnection or at a time when the MME 120 successfully completes the attach without making the PDN connection, the MME 120, at operation 830, can operate a timer for efficient resource management of the network. For example, the timer may be a resource saving detach timer.

In this case, as at operation 840, if the PDN connection is established before the timer (e.g., resource saving detach timer) expires, the timer (e.g., power saving detach timer) can stop.

On the other hand, if the timer (e.g., power saving detach timer) expires as at operation 850, the MME 120, at operation 860, may transmit a detach request message to the terminal 100 to be detached from the network.

Figure 9:
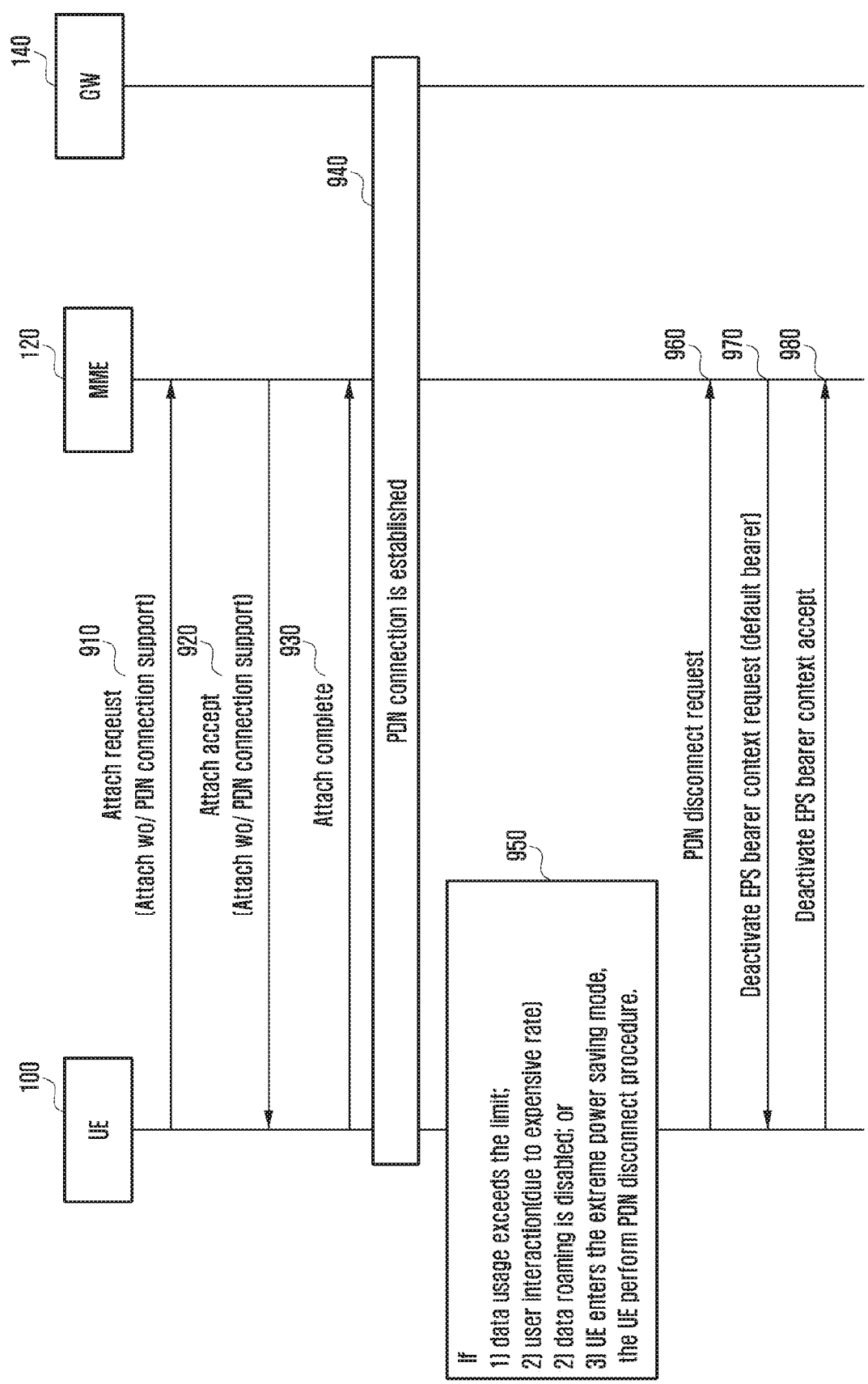
FIG. 9 is a diagram illustrating an example of a procedure for effectively using resources according to an embodiment of the disclosure.

FIG. 9 is a diagram illustrating an example of a procedure for effectively using resources according to an embodiment of the disclosure.

Referring to FIG. 9, the terminal 100 according to an embodiment of the disclosure can exchange a control message with the network (MME 120 and GW 140) in order to effectively use resources.

At operation 910, the terminal 100 can transmit, to the MME 120, information on whether the terminal 100 supports an attach without PDN connection. In this case, the information on whether the terminal 100 supports the attach without PDN connection can be included in an attach request message to be transmitted to the MME 120.

At operation 920, the MME 120 can transmit, to the terminal 100, information on whether the MME 120 supports an attach without PDN connection. In this case, the information on whether the MME 120 supports the attach without PDN connection can be included in an attach accept message to be transmitted to the terminal 100.

After completion of the attach at operation 930, as needed, the terminal 100, at operation 940, can request a PDN connection setup by transmitting a PDN connectivity request message to the GW 140. Then, the terminal 100 can establish the PDN connection accordingly.

On the other hand, as at operation 950, the terminal 100 can determine whether the terminal 100 corresponds to cases where 1) the terminal 100 enters into an ultra power saving mode in which the terminal 100 is set to use the CS service only, 2) the terminal 100 has a usage limit not to use the PS data service during roaming, 3) the terminal 100 has the usage amount limit of the PS data service, and is limited not to use the PS data service any more due to the usage of the PS data exceeding the predetermined total PS data usage amount, and 4) whether information for selecting the data connection free 325 is input from a user through the connectivity manager 210 of the terminal 100.

If the terminal 100 corresponds to operation 950 as described above, the terminal 100 can identify whether the MME 120 to which the terminal 100 is currently attached supports the attach without PDN connection, and if the MME 120 supports the attach without PDN connection, the terminal 100 can send, to the MME 120, a PDN disconnection request message with respect to all PDN connections.

Then, at operation 970, the MME 120 that has received the PDN disconnection request message can transmit, to the terminal 100, a deactivate EPS bearer context request message with respect to the default bearer of the corresponding PDN connection to delete the corresponding PDN connection.

Thereafter, at operation 980, the terminal 100 that has received the deactivate EPS bearer context request message can notify the MME 120 that the PDN connection is deleted by transmitting a deactivate EPS bearer context accept message to the MME 120.

Figure 10:
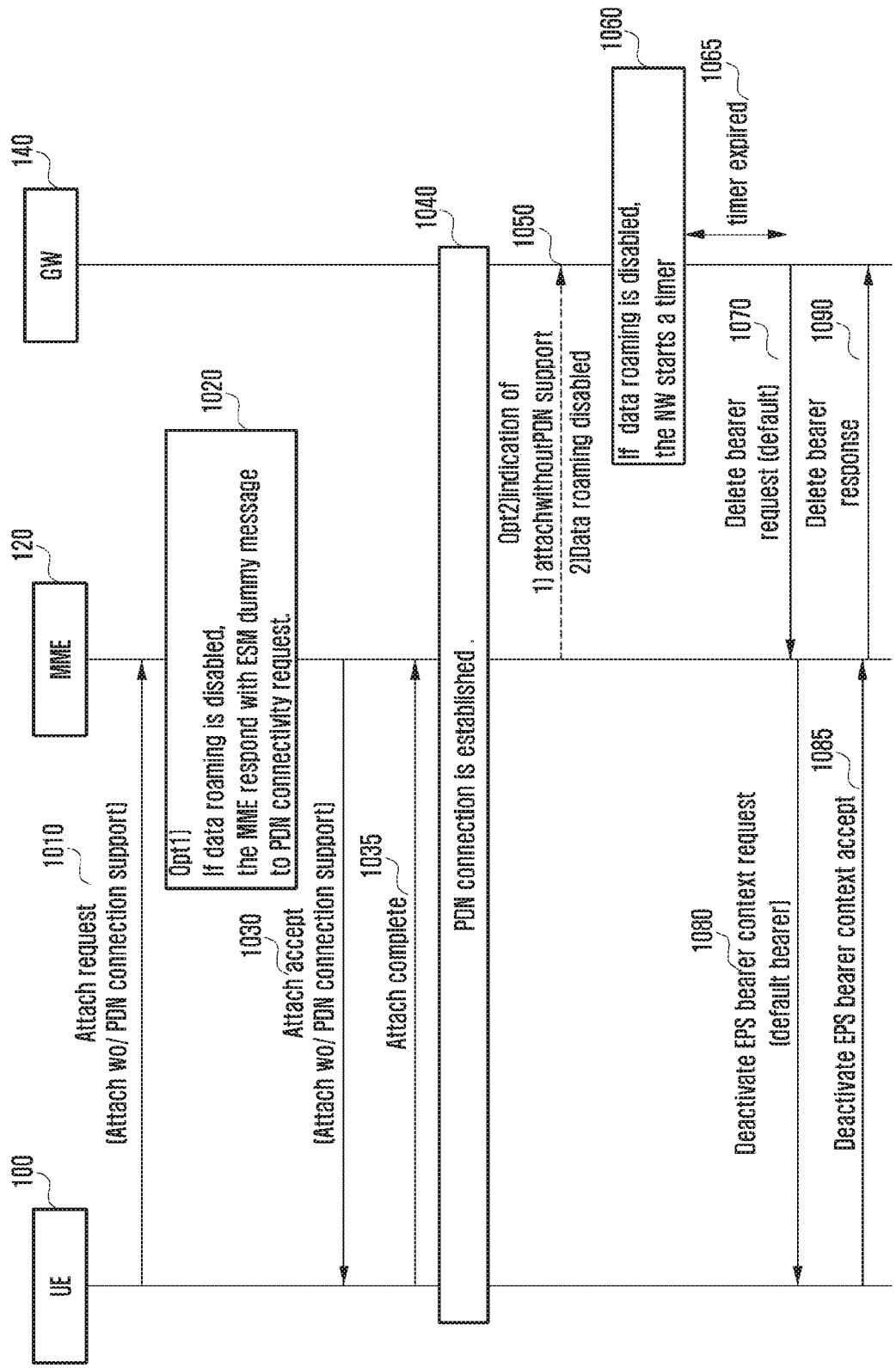
FIG. 10 is a diagram illustrating another example of a procedure for effectively using resources according to an embodiment of the disclosure.

FIG. 10 is a diagram illustrating another example of a procedure for effectively using resources according to an embodiment of the disclosure.

Referring to FIG. 10, the MME 120 according to an embodiment of the disclosure can exchange a control message with the terminal 100 in order to perform an operation for effectively using resources, such as PDN connection establishment or PDN disconnection.

At operation 1010, the terminal 100 can transmit, to the MME 120, information on whether the terminal 100 supports an attach without PDN connection. In this case, the information on whether the terminal 100 supports the attach without PDN connection can be included in an attach request message to be transmitted to the MME 120.

If the subscription is configured so that data roaming for the terminal 100 is not possible, the MME 120, at operation 1020, may transmit an ESM dummy message to the terminal 100 as a response to a PDN connectivity request message even if the MME 120 has received the PDN connectivity request message from the terminal 100. In this case, the ESM dummy message may be included in an attach accept message to be transmitted to the terminal 100.

Further, at operation 1030, the MME 120 can transmit, to the terminal 100, information indicating whether the MME 120 supports the attach without PDN connection. In this case, the information indicating whether the MME 120 supports the attach without PDN connection may be included in the attach accept message to be transmitted to the terminal 100.

Further, after completion of the attach at operation 1035, as needed, the terminal 100, at operation 1040, can request a PDN connection setup by transmitting a PDN connectivity request message to the GW 140. Then, the terminal 100 can establish the PDN connection accordingly.

On the other hand, at operation 1050 after the attach, the MME 120 can transmit, to the GW 140, information on whether the terminal 100 and the MME 120 support the attach without PDN connection. Further, the MME 120 can transmit, to the GW 140, information indicating that data roaming for the terminal 100 becomes impossible.

In this case, the GW 140 performs a procedure of deleting the PDN connection after a predetermined time. For this, at operation 1060, the GW 140 can operate a timer if it is detected that the data roaming for the terminal 100 becomes impossible. Then, at operation 1065, the timer can expire.

In this case, at operation 1070, the GW 140 can transmit a delete bearer request message to the MME 120 with respect to the default bearer of the corresponding PDN connection. Accordingly, at operation 1080, the MME 120 can transmit a deactivate EPS bearer context request message for the default bearer to the terminal 100 to delete the corresponding PDN connection. Further, at operation 1085, in response to the deactivate EPS bearer context request message, the terminal 100 can transmit a deactivate EPS bearer context accept message to the MME 120, and thus the MME 120 can transmit a delete bearer response message to the GW 140.

Figure 11:
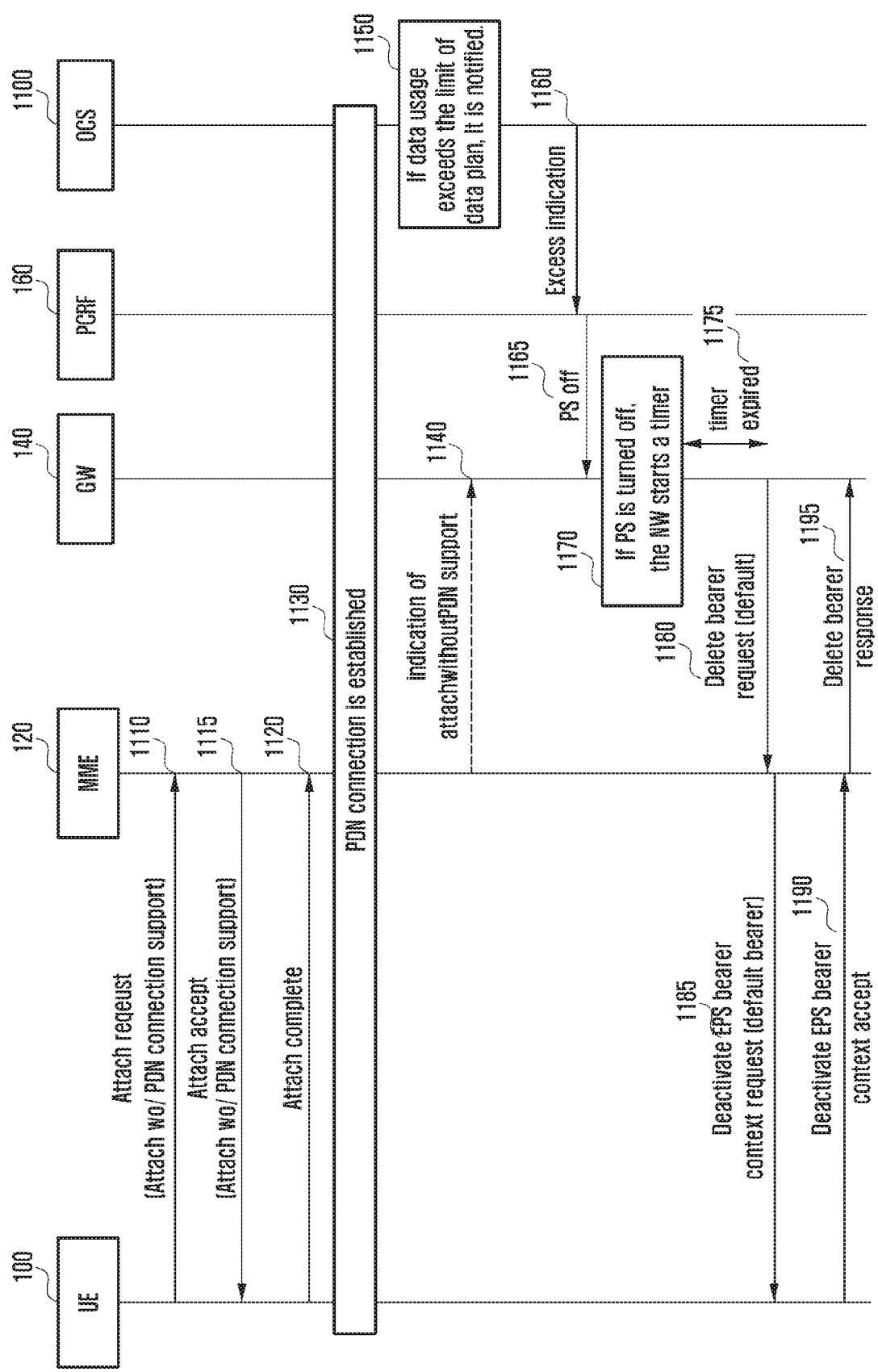
FIG. 11 is a diagram illustrating still another example of a procedure for effectively using resources according to an embodiment of the disclosure.

FIG. 11 is a diagram illustrating still another example of a procedure for effectively using resources according to an embodiment of the disclosure.

Referring to FIG. 11, in an embodiment of the disclosure, the MME 120 that is collocated with the GW 140 can exchange a control message with each other in order to perform an operation for effectively using resources, such as PDN connection establishment or PDN disconnection.

The terminal 100 and the MME 120 can be attached to the network through operations 1110, 1115, and 1120. Further, the terminal can establish a PDN connection through operation 1120. Since the detailed explanation thereof has been described in the description related to operations 910 to 940 of FIG. 9 or operations 1010 to 1040 of FIG. 10, duplicate explanation thereof will be omitted.

If both the terminal 100 and the MME 120 support the attach without PDN connection, the MME 120, at operation 1140, can transmit, to the GW 140, information on whether the attach without PDN connection can be supported.

On the other hand, at operation 1150, the online charging system (OCS) 1100 can determine whether the data usage amount of the terminal 100 exceeds the limit of a data plan of the terminal 100 (i.e., predetermined total PS data usage amount). Further, if the terminal 100 has used the PS data that exceeds the predetermined total PS data usage amount, the OCS 1100, at operation 1160, can transmit information indicating that the PS data exceeds the limit to the PCRF 160. Accordingly, at operation 1165, the PCRF 160 can transmit, to the GW 140, information for requesting the GW 140 to stop the PS data service.

Further, the GW 140 that has received the information for requesting to stop the PS data service (e.g., it may be an indication) can perform a procedure of deleting the PS data service after a predetermined time. For this, if the information for requesting to stop the PS data service is received, the GW 140, at operation 1170, can operate a timer. Further, at operation 1175, the timer can expire.

In this case, at operation 1180, the GW 140 can transmit a delete bearer request message to the MME 120 with respect to the default bearer of the corresponding PDN connection. Accordingly, at operation 1185, the MME 120 can transmit a deactivate EPS bearer context request message for the default bearer to the terminal 100 to delete the corresponding PDN connection. Further, at operation 1190, in response to the deactivate EPS bearer context request message, the terminal 100 can transmit a deactivate EPS bearer context accept message to the MME 120, and thus the MME 120 can transmit a delete bearer response message to the GW 140.

Figure 12:
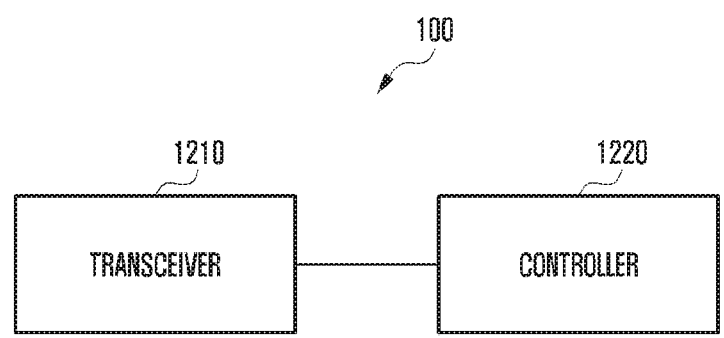
FIG. 12 is a block diagram illustrating the configuration of a terminal according to an embodiment of the disclosure.

FIG. 12 is a block diagram illustrating the configuration of a terminal according to an embodiment of the disclosure.

Referring to FIG. 12, the terminal 100 according to an embodiment of the disclosure may include a transceiver 1210 and a controller 1220 configured to control the overall operation of the terminal 100.

The controller 1220 of the terminal 100 controls the terminal 100 to perform any one of operations according to embodiments to be described later. For example, the controller 1220 can determine whether both the terminal 100 and the MME 120 can make an attach without establishing a PDN connection, determine whether a condition for not establishing the PDN connection is satisfied if both the terminal 100 and the MME 120 can make the attach without establishing the PDN connection, and transmit, to the MME 120, an attach request message including information for requesting not to establish the PDN connection if the condition for not establishing the PDN connection is satisfied.

Further, the transceiver 1210 of the terminal 100 can transmit and receive signals in accordance with any one of operations according to embodiments to be described later. For example, the transceiver 1210 can transmit the attach request message to the MME 120, and can receive a message indicating whether to permit the attach from the MME 120.

On the other hand, it is not necessary that the controller 1220 and the transceiver 1210 are implemented by separate devices, but can be implemented by one constituent part in the form of a single chip.

The controller 1220 may be implemented on a processor, a single chip, a plurality of chips, or a plurality of electric components. For example, various architectures including a dedicated or embedded processor, a single-purpose processor, a controller, an ASIC, and the like can be used for the controller 1220.

Figure 13:
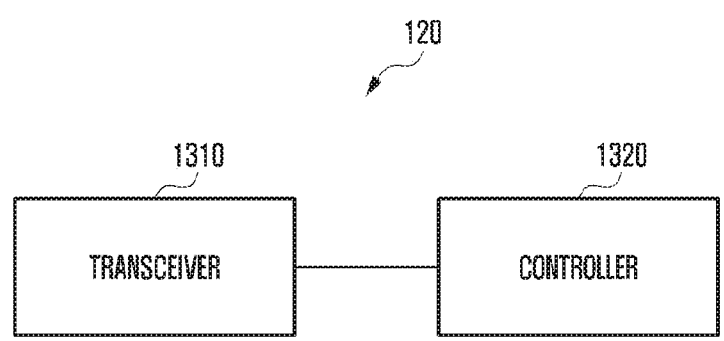
FIG. 13 is a block diagram illustrating the configuration of an MME according to an embodiment of the disclosure.

FIG. 13 is a block diagram illustrating the configuration of an MME according to an embodiment of the disclosure.

Referring to FIG. 13, the MME 120 according to an embodiment of the disclosure may include a transceiver 1310 and a controller 1320 configured to control the overall operation of the MME 120.

The controller 1320 of the MME 120 controls the MME 120 to perform any one of operations according to embodiments to be described later. For example, the controller 1320 can determine whether both the terminal 100 and the MME 120 can make an attach without establishing a PDN connection, determine whether a condition for not establishing the PDN connection is satisfied if both the terminal 100 and the MME 120 can make the attach without establishing the PDN connection, and transmit, to the terminal 100, an attach response message including information for indicating not to establish the PDN connection if the condition for not establishing the PDN connection is satisfied.

Further, the transceiver 1310 of the MME 120 can transmit and receive signals in accordance with any one of operations according to embodiments to be described later. For example, the transceiver 1310 can receive the attach request message from the terminal 100, and can transmit a message indicating whether to permit the attach to the terminal 100.

On the other hand, it is not necessary that the controller 1320 and the transceiver 1310 are implemented by separate devices, but can be implemented by one constituent part in the form of a single chip.

The controller 1320 may be implemented on a processor, a single chip, a plurality of chips, or a plurality of electric components. For example, various architectures including a dedicated or embedded processor, a single-purpose processor, a controller, an ASIC, and the like can be used for the controller 1320.

The above-described operations of the base station or the terminal can be realized by providing a memory device storing therein corresponding program codes in a certain constituent part in the base station or the terminal device. That is, the controller of the base station or the terminal device can execute the above-described operations by reading and executing the program codes stored in the memory device through a processor or a central processing unit (CPU).

Various constituent parts of the entity, the base station, or the terminal device as described above and modules can operate using hardware circuits, for example, a complementary metal oxide semiconductor based logic circuit, firmware, software, and/or hardware and firmware and/or software combination inserted in a machine readable medium. As an example, various electric structures and methods can be embodied using transistors, logic gates, and electric circuits such as application specific integrated circuits (ASIC).

Embodiments disclosed in this specification and drawings are illustrated to present only specific examples in order to clarify the technical contents and help understanding of the disclosure, but are not intended to limit the scope of the disclosure. It will be evident to those skilled in the art that various implementations based on the technical idea of the disclosure are possible in addition to the disclosed embodiments.

Meanwhile, preferred embodiments of the disclosure disclosed in this specification and drawings and specific terms used therein are illustrated to present only specific examples in order to clarify the technical contents of the disclosure and help understanding of the disclosure, but are not intended to limit the scope of the disclosure. It will be evident to those skilled in the art that various modifications based on the technical spirit of the disclosure are possible in addition to the disclosed embodiments.

The invention claimed is:

1. A method performed by a terminal in a wireless communication system, the method comprising:
   determining whether the terminal and a mobility management entity (MME) support an attachment without establishing a packet data network (PDN) connection;
   determining whether a first condition for not establishing the PDN connection is satisfied, in case that the terminal and the MME support the attachment without establishing the PDN connection;
   transmitting, to the MME, an attach request message including information for requesting the attachment without establishing the PDN connection, in case that the first condition for not establishing the PDN connection is satisfied;
   starting a timer based on the attachment being completed successfully, in case that an attaching for a circuit switched (CS) service is not made; and
   transmitting, to the MME, a detach request message based on the timer being expired.

2. The communication method of claim 1, further comprising:
   determining whether a second condition for configuring the PDN connection is satisfied after an attaching without the PDN connection is completed in accordance with the attach request message; and
   transmitting a PDN connection request message to the MME in case that the second condition for configuring the PDN connection is satisfied.

3. The communication method of claim 1, wherein the first condition for not establishing the PDN connection comprises at least one of whether the terminal is configured to use only a circuit switched (CS) service, whether the terminal has a usage limit not to use a packet switched (PS) data service during roaming, whether the terminal is limited not to use the PS data service any more, whether the terminal is a terminal requiring only a control signal to use the service, or whether information for indicating not to establish the PDN connection is received from a user.

4. A terminal in a wireless communication system, the terminal comprising:
   a transceiver configured to transmit and receive signals; and
   a controller configured to:
   determine whether the terminal and a mobility management entity (MME) support an attachment without establishing a packet data network (PDN) connection,
   determine whether a first condition for not establishing the PDN connection is satisfied, in case that the terminal and the MME support the attachment without establishing the PDN connection
   transmit, to the MME via the transceiver, an attach request message including information for requesting the attachment without establishing the PDN connection, in case that the first condition for not establishing the PDN connection is satisfied,
   start a timer based on the attachment being completed successfully, in case that an attaching for a circuit switched (CS) service is not made, and
   transmit, to the MME via the transceiver, a detach request message based on the timer being expired.

5. The terminal of claim 4, wherein the controller is configured to determine whether a second condition for configuring the PDN connection is satisfied after an attaching without the PDN connection is completed in accordance with the attach request message, and transmit a PDN connection request message to the MME, in case that the second condition for configuring the PDN connection is satisfied.

6. The terminal of claim 4, wherein the first condition for not establishing the PDN connection comprises at least one of whether the terminal is configured to use only a circuit switched (CS) service, whether the terminal has a usage limit not to use a packet switched (PS) data service during roaming, whether the terminal is limited not to use the PS data service any more, whether the terminal is a terminal requiring only a control signal to use the service, or whether information for indicating not to establish the PDN connection is received from a user.

7. A method performed by a mobility management entity (MME) in a wireless communication system, the method comprising:
   receiving, from a terminal, an attach request message including information for requesting an attachment without establishing a packet data network (PDN) connection;
   determining whether the terminal and the MME support the attachment without establishing the PDN connection;
   determining whether a condition for not establishing the PDN connection is satisfied, in case that the terminal and the MME support the attachment without establishing the PDN connection;
   transmitting, to the terminal, an attach response message including information for indicating not to establish the PDN connection as a response to the attach request message, in case that the condition for not establishing the PDN connection is satisfied; and
   receiving, from the terminal, a detach request message, in case that an attaching for a circuit switched (CS) service for the terminal is not made,
   wherein the detach request message is transmitted base on a timer started by the terminal based on the attachment being completed successfully.

8. The communication method of claim 7, further comprising:
   transmitting, to a gateway, information on whether the terminal and the MME support the attachment without establishing the PDN connection.

9. The communication method of claim 7, wherein the condition for not establishing the PDN connection comprises at least one of whether usage of a packet switched (PS) data service is limited during roaming of the terminal or whether a gateway for configuring the PDN connection does not exist.

10. A mobility management entity (MME) in a wireless communication system, the MME comprising:
a transceiver; and
a controller configured to:
receive, from a terminal via the transceiver, an attach request message including information for requesting an attachment without establishing a packet data network (PDN) connection,
determine whether the terminal and the MME support the attachment without establishing the PDN connection,
determine whether a condition for not establishing the PDN connection is satisfied, in case that the terminal and the MME support the attachment without establishing the PDN connection, and
transmit, to the terminal via the transceiver, an attach response message including information for indicating not to establish the PDN connection as a response to the attach request message, in case that the condition for not establishing the PDN connection is satisfied, and
receive, from the terminal via the transceiver, a detach request message, in case that an attaching for a circuit switched (CS) service for the terminal is not made,
wherein the detach request message is transmitted base on a timer started by the terminal based on the attachment being completed successfully.

11. The MME of claim 10, wherein the controller is configured to transmit, to a gateway via the transceiver, information on whether the terminal and the MME support the attachment without establishing the PDN connection.

* * * * *